Fig. 2a

INVENTORS
Arthur E. Brown,
Edward G. Gaeke,
John D. Hiller &
Harry C. Zeisloft
BY Paul Fitzpatrick
ATTORNEY July 2, 1963  A. E. BROWN ETAL  3,095,702
AFTERBURNER FUEL CONTROL Filed Sept. 26, 1960  5 Sheets-Sheet 3

Fig.2b

INVENTORS
Arthur E. Brown,
Edward G. Gaeke,
John D. Hiller &
Harry C. Zeisloft
BY
Paul Fitzpatrick
ATTORNEY

INVENTORS
Arthur E. Brown,
Edward G. Gaeke,
John D. Hiller &
Harry C. Zeisloft
BY Paul Fitzpatrick
ATTORNEY

United States Patent Office 3,095,702
Patented July 2, 1963

3,095,702
AFTERBURNER FUEL CONTROL
Arthur E. Brown, Cincinnati, Ohio, Edward G. Gaeke, Waukesha, Wis., John D. Hiller, Cincinnati, Ohio, and Harry C. Zeisloft, Brookfield, Wis., assignors to General Motors Corporation, Detroit, Mich., a corporation of Delaware
Filed Sept. 26, 1960, Ser. No. 58,286
5 Claims. (Cl. 60—39.28)

Our invention is directed to a system and apparatus for controlling the supply of fluid to afterburners, otherwise known as reheat or tailpipe burners, or turbojet engines. Some features and aspects of the invention are applicable to other fuel metering installations.

The principal purpose of the invention is to provide an improved control for the afterburners of jet engines adapted to operate at high speeds, and particularly over a range of speeds above and below Mach 1. The control, in its preferred embodiment, includes various safeguards or overrides to protect the engine and the aircraft. It includes means for controlling fuel primarily as a matter of desired fuel to air ratio during subsonic and transonic flight and for controlling fuel to hold air speed at a preselected Mach number in supersonic flight.

The fuel system in its entirety also includes provisions for minimizing waste of energy in the afterburner fuel pump and for selection of one or more fuel manifolds in the afterburner.

The invention resides particularly in a combination of control instrumentalities to provide safe, efficient, and precise supply of afterburner fuel. In view of the complexity of the embodiment of the invention in its preferred form, it is described here in such fashion as to eliminate burdensome and needless disclosure of immaterial mechanical details. The subsequent description will make clear to those skilled in the art the nature of the system and the advantages thereof, and the nature of the instrumentalities preferably employed to constitute the system.

Referring to the drawings.

FIGURE 2 (FIGURES 2a and 2b taken together) is a somewhat schematic sectional view of the afterburner fuel control of the system.

Introduction

Figure 1:
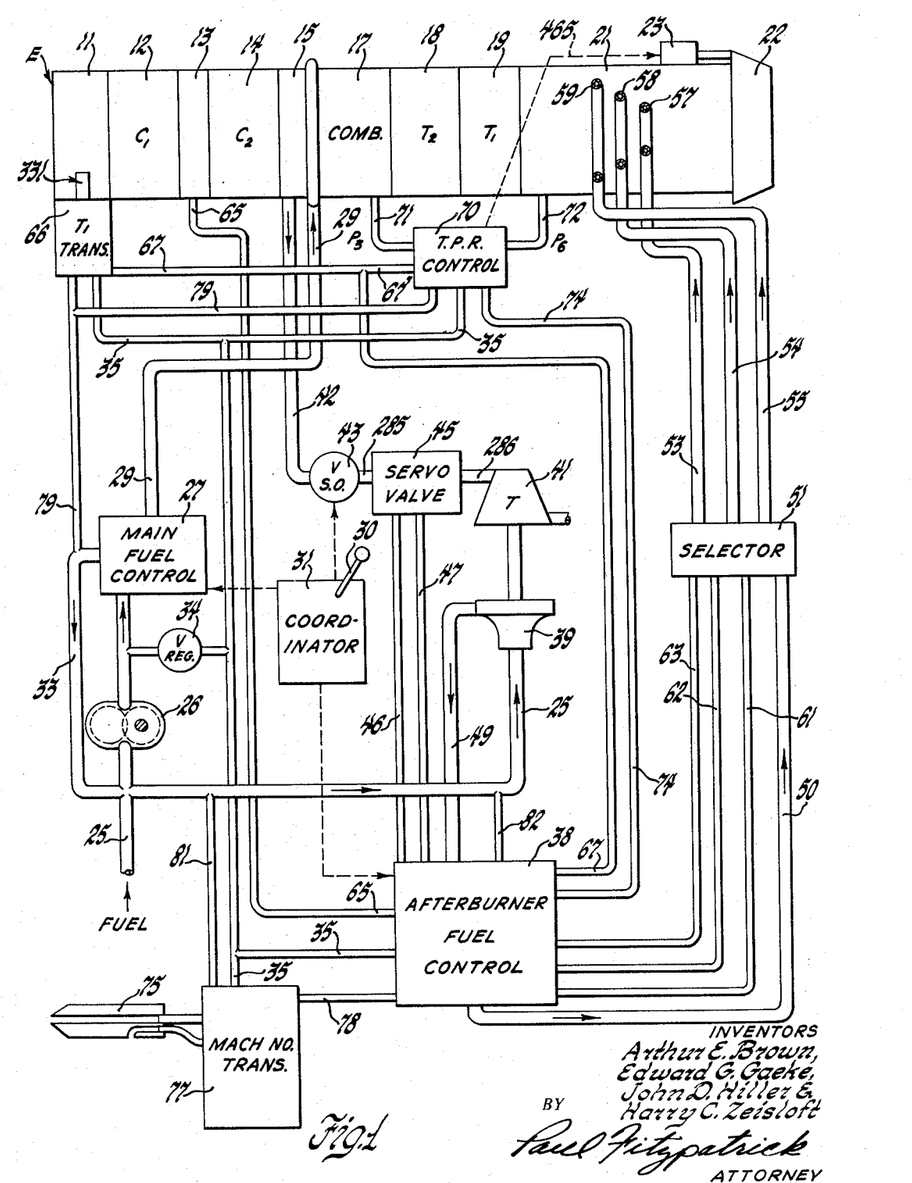
FIGURE 1 is a schematic diagram of a fuel supply and control system for an afterburning turbojet engine.

Reference may be made first to FIGURE 1 for a general survey of the afterburner fuel system. The figure illustrates diagrammatically a two-spool afterburning turbojet engine E including an air inlet section 11, a low pressure compressor 12, an intercompressor frame 13, a high pressure compressor 14, a diffuser or transition section 15, combustion section 17, a high pressure turbine 18, a low pressure turbine 19, and an exhaust duct 21. Such engines are well known. The air flows through the elements in the order in which they have been named. The high pressure turbine drives the high pressure compressor and the low pressure turbine drives the low pressure compressor. The exhaust duct 21 terminates in any suitable jet propulsion nozzle, indicated schematically as a variable nozzle 22, controlled by one or more servo devices 23. The means for varying the nozzle area is immaterial to this invention and will not be described.

Fuel for the main combustion apparatus 17 is supplied from any suitable source such as a conduit 25 running from an aircraft boost pump. The fuel is fed by a pump 26, ordinarily driven by one of the turbines, through a main fuel control 27 and a main fuel line 29 to the combustion apparatus 17. The main fuel control may be set to the desired engine operating level by a manually operable pilot's power control lever 30, operating through a coordinator 31 and any suitable connecting linkage to provide a power, speed, or temperature setting for the fuel control. The main fuel control may be of a type which bypasses excess fuel discharged by pump 26 through a return or by-pass line 33 into the supply line 25.

The main fuel system will not be further described, since it is immaterial to the afterburner control except for the fact that it preferably serves as a source of fuel under pressure by which servos in the afterburner fuel control devices are operated. This servo fuel may be supplied from pump 26 through a suitable pressure regulating valve 34, if desired, and through servo fuel supply lines 35 extending to the afterburner fuel control 38 and to other elements of the fuel system to be described.

The afterburner fuel control determines the amount of fuel supplied to an afterburner in the exhaust duct 21 under control of the aircraft pilot through the control lever 30 and coordinator 31. The coordinator is suitably coupled through any motion transmitting connection to the afterburner fuel control so that the thrust augmentation or fuel flow setting of the afterburner is properly coordinated with the operation of the turbojet engine ahead of it.

The afterburner fuel is fed by a suitable pump, which may be a centrifugal pump 39 the inlet of which is connected to the fuel supply line 25. Pump 39 is preferably driven by an air turbine 41 supplied from the engine E. The means for supplying air to drive turbine 41 may comprise a bleed line 42 connected to the midframe 15, a shutoff valve 43, and a servo valve 45. The shutoff valve is closed except when afterburning is desired, when it may be opened by any suitable coupling to the coordinator 31 indicated by the broken line. The servo valve 45 modulates the flow of air to the turbine 41 so as to avoid unnecessary pressurizing of the fuel with attendant unnecessary throttling. The servo valve control includes two pressure lines 46 and 47 connecting it to the afterburner fuel control 38.

The afterburner fuel pump 39 is connected by a line 49 to the afterburner fuel control which meters the fuel and supplies it through a line 50, a manifold selector valve 51, and supply lines 53, 54, and 55 to the fuel manifolds or spray rings 57, 58, and 59 of the afterburner. The manifold selection is effected by valves in the selector operated by pilot valves in the fuel control 38 through pressure lines 61, 62, and 63.

The afterburner fuel control responds to low pressure compressor discharge pressure supplied to it through a pressure line 65. Another element of the system is an inlet air temperature transducer or $T_1$ sensor 66, which receives servo fuel through line 35 and transmits a pressure $P_T$ indicative of inlet temperature through line 67 to the fuel control 38.

The system also includes a turbine pressure ratio control 70 which receives inputs of turbine inlet pressure $P_3$ and turbine discharge pressure $P_6$ through pressure sensing lines 71 and 72, respectively. The pressure ratio control also receives servo fuel through line 35 and $P_T$ through a branch 67' of line 67. Control line 74 connects the pressure ratio control to the fuel control 38.

The response to aircraft speed depends upon a Pitot-static pressure probe 75 in the air stream and a Mach number transducer 77 which receives servo fuel through line 35 and modulates the pressure in accordance with aircraft Mach number to provide a pressure $P_M$ in control line 78 connected to the afterburner fuel control. In general, the control devices must discharge used servo fuel and leakage fuel back to fuel inlet or boost pressure. The turbine pressure ratio control and inlet temperature sensor are connected to bypass line 33 through conduits 79. The Mach number transducer has a drain line 81, and the afterburner fuel control a drain line 82 to the fuel inlet line.

Afterburner Fuel Control

The foregoing will indicate the scope of the material to be described. The portion of particular interest from the standpoint of our invention is the afterburner fuel control shown in FIGURES 2a and 2b. The inlet temperature sensor, turbine pressure ratio control, servo valve and Mach number transducer illustrated in FIGURES 3 to 6 are merely accessories or auxiliary devices. They will be described to aid in disclosure of the control system as a whole.

Referring to FIGURE 2, the afterburner fuel control 38 is shown schematcially to some extent so as to bring the various operating mechanisms into the plane of the drawing. It comprises a body or housing indicated generally as 85. The fuel inlet line 49 from the afterburner fuel pump connects with the metering valve 86 which discharges through a passage 87 and the head regulating valve 88 into the fuel control discharge line 50 through which fuel flows to the afterburner.

The metering valve 86 is of the type having a movable valve member which is both rotatable and axially movable to vary the port area. The flow through the metering valve is determined by the port area and by the pressure drop across the valve, which is immediately controlled by the regulating valve 88. The metering valve 86 comprises a fixed outer sleeve 89 having ports 90 and a movable inner sleeve or valve member 91 having ports 93. The inner sleeve includes an axially extended gear 94 at the upper end thereof which coacts with a rack 95, actuated by means to be described, which rotates the sleeve.

Vertical movement of valve member 91 is accomplished by a force-balance type servo responsive to a pressure indicative of air flow in the engine. While such pressure may be derived from various points within the engine, it is preferably taken through line 65 from the outlet of the low pressure compressor. Line 65 is connected to a port 97 in a part 98 of the body which communicates through a port in a bellows support 99 with the interior of a pressure bellows 101 mounted on the support 99. The other end of bellows 101 is fixed to an axially movable head or spider 102, the other face of which is fixed to an evacuated bellows 103 which compensates for the pressure external to bellows 101 and 103. Bellows 103 has a lower head 104 which bears against a cup-shaped support 106 mounted on the body 85. The movable spider 102 is suitably fixed to a reciprocable spring abutment 107 which bears against compression springs 109 and 110 which oppose the pressure within the bellows 101.

Reciprocation of the member 102 because of changes of pressure operates a servo valve 111 of standard type which controls the supply of servo fluid to a chamber between the lower face of a piston 112, fixed to movable valve member 91, and a cylinder head 113. The movable valve member in turn bears against the lower end of compression springs 109 and 110 through a thrust bearing 114 and spring retainer 115. The servo valve comprises a sleeve 117 and a movable valve spool 118, the latter being coupled by a rocker arm 119 to the member 102.

Servo fuel supplied through the line 35 is indicated on the drawing by the symbol "S." Such servo fluid is supplied to the valve sleeve 117 and through a passage 121 to the interior of fixed valve member 89 to lubricate the valve member 91. Valve 111 also is connected to a servo fuel return, indicated by "R," through a passage which drains into the servo fuel return line 82 by way of the interior of case 85. A passage 122 connects valve 111 to the chamber 123 in which the fuel bears against the piston 112. This piston, which is spool-shaped, is provided with an inlet 125 for fuel, a filter 126, and passages 127 by which the filtered fuel washes the outer surface of the lower head of the piston.

The operation of this servomechanism is well known and need not be described beyond pointing out that expansion of bellows 101 operates the servo valve to supply fuel to chamber 123 and move valve member 91 upwardly, thereby increasing the fuel metering area and compressing springs 109 and 110 until the bellows 101 is returned to its original dimension and the valve spool 118 is centered in the sleeve 117. Decreases in pressure correspondingly operate to close the valve 86.

Structure for calibrating the pressure responsive mechanism may be mentioned briefly. The springs 109 and 110 are opposed by a light calibrating spring 129 which bears against a reciprocable non-rotatable abutment 130 having a threaded connection to a rotatable adjusting member 131 which is located axially by a snap ring 133. A hex socket in the member 131 permits adjustment, and after the adjustment is completed, receives a locking member 134 which is non-rotatably connected to the portion 94 of the case and is retained by a cap 135 held in place by means not illustrated.

Figure 2A:
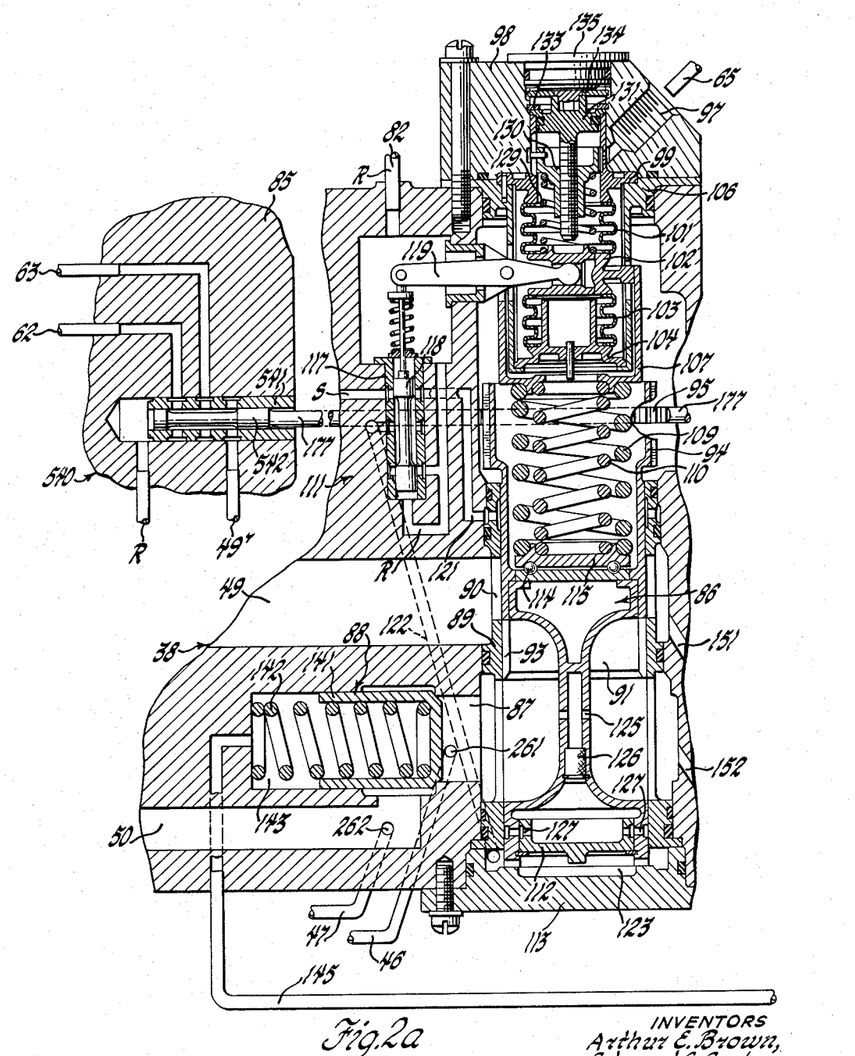
Figure 2B:
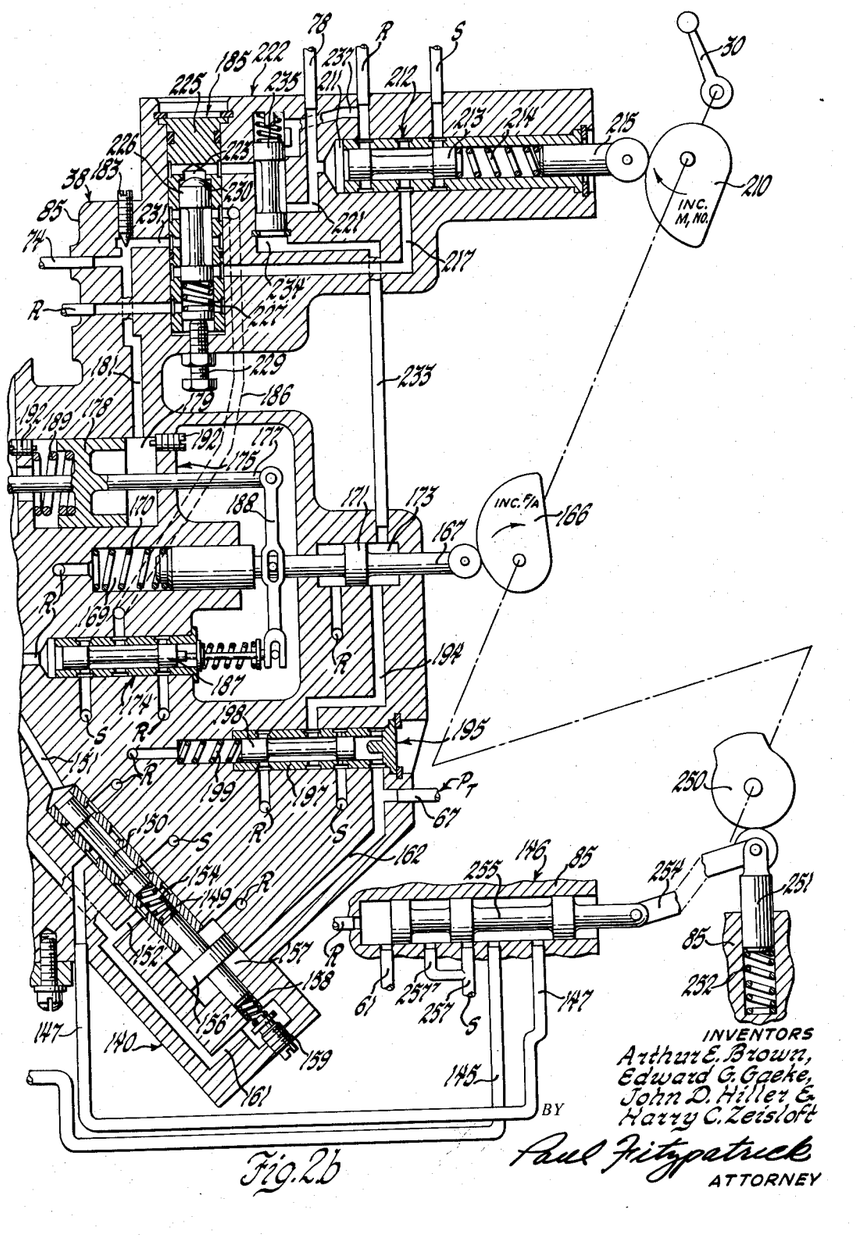

Leaving for later description the mechanism by which the metering valve is rotated, we may proceed to the means for regulating the pressure drop or metering head through this valve. In the illustrated embodiment of the invention, this is accomplished by throttling valve 88 in series with metering valve 86 which throttles flow so as to maintain a predetermined pressure drop across metering valve 86. The predetermined pressure drop is a function of engine inlet air temperature. Head regulating valve 88 is operated by servo fluid, the pressure of which is varied by a head regulating pilot valve 140 (FIGURE 2b). This valve responds to the pressures at each side of the metering valve and to the pressure representative of inlet air temperature which is derived by the inlet temperature sensor 66 and supplied to the afterburner fuel control through line 67.

Valve 88 comprises a cup-shaped slidable poppet 141 seating against a shoulder of the passage 87, urged in the opening direction by the pressure of the fuel supplied to it and biased in the closing direction by a compression spring 142 and by servo pressure in the chamber 143 behind the valve member. Chamber 143 is connected by a passage 145 with a shutdown valve 146 which, in normal operation of the afterburner, is set as shown in FIGURE 2b. In this position, passage 145 is connected through valve 146 to a passage 147 leading to the pilot valve 140. Passage 147 communicates through radial ports in the fixed sleeve 149 of valve 140 with servo fuel supply and return ports controlled by the movable valve spool 150. The upper end of spool 150, as illustrated, communicates through passage 151 with the inlet line 49 to the metering valve. The metering valve outlet is connected by a passage 152 to the interior of sleeve 149 below the lower face of spool 150. As will be apparent, the spool is biased downwardly, in the direction to supply servo fuel to the chamber 143, by the pressure in advance of the metering valve, and biased in the direction to bleed servo fuel from chamber 143 by the pressure downstream of the metering valve. The difference between these pressures resulting from the action of the head regulating valve 88 is therefore determined by a compression spring 154 which biases spool 150 in the upward direction.

The loading of spring 154 is determined by a small piston 156, reciprocable in a cylinder 157, the stem of which bears against one end of spring 154. The other end of the stem of piston 156 bears against a small compression spring 158, the loading of which may be preset by an adjusting screw 159. Both ends of the stem of piston 156 are exposed to the same pressure, since a passage 161 connects the chambers at each end of this stem. The upper face of piston 156 is exposed to the servo return or datum pressure, whereas the lower face is exposed to the pressure developed by the inlet temperature sensor and supplied through line 67 and a passage 162 to the lower end of cylinder 157. In this embodiment of the invention, the pressure responsive to inlet air temperature is generated by a device which produces a pressure inversely proportional to the absolute inlet temperature. Thus, the effective force on piston 156, and therefore the metering head, are inversely proportional to inlet air temperature.

Therefore, for any given opening of the metering valve 86, fuel flow is proportional to the square root of absolute temperature of the air entering the engine. It is also proportional to the pressure of the air in the engine as a result of the axial movement of the valve member 91. The pressure of the air within the engine divided by the square root of its temperature provides a reasonably precise indication of mass air flow. Such being the case, the amount of flow through the metering valve will be proportional to the product of mass air flow and the angular rotation of the valve from its cut-off position. For this reason, the predetermined angular position of valve member 91 provides a predetermined ratio of fuel to air flow in the afterburner in low speed flight of the aircraft. It is contemplated that afterburner fuel be metered to provide any fuel-air ratio desired by the pilot within the practicable or usable range of fuel to air. As previously mentioned, however, the pilot's request for a fuel to air ratio may be overridden in the event that it results in too low a pressure ratio or too high an inlet temperature, or too high air speed in terms of Mach number.

The basic fuel-air ratio demand signal in the afterburner fuel control is provided by a cam 166 rotated by the pilot's power control lever 30, as illustrated schematically in FIGURE 2b, the actual connection being through the coordinator as illustrated schematically in FIGURE 1. As illustrated, cam 166 rotates clockwise to increase fuel-air ratio. The mounting and mechanical supports of the shaft for cam 166 and the physical connections from it to the lever 30 are immaterial and are not illustrated. Cam 166 controls a reciprocating follower 167 guided in a bore 169 in the body which is vented to return pressure. The follower is biased into engagement with the cam by a compression spring 170. The follower also includes a piston 171 guided in a cylinder 173 in the case, the purpose of which will be explained. Fuel-air ratio cam 166 and follower 167 control, through a standard servo valve 174, a servomotor 175 which reciprocates a rod 177 bearing the rack 95 which rotates the metering valve member 91.

Servomotor 175 comprises a piston 178 fixed to the rod 177 and reciprocable in a cylinder having a pressure chamber 179 connected through passage 181, a needle valve 183, a transfer valve 185, and passage 186 to the control or pilot valve 174, which is of standard type. The movable member 187 of this valve is coupled by a floating lever 188 in the usual way to the stem 177 and cam follower 167 so that any movement of the follower 167 actuates the valve 174 to cause the piston 178 to follow this movement. The pressure in chamber 179 acts against a compression spring 189 in the opposite end of the cylinder. The range of movement of piston 178 and rack 95 and thus the range of rotary movement of valve 91 are determined by adjustable stop screws 192.

The function of the transfer valve 185 and the relation of the turbine pressure ratio control to the operation of the servomotor 175 will be explained.

*Inlet Temperature Fuel Override*

The cam follower 167 may be moved to the left, which is the direction to decrease afterburner fuel, by the piston 171 under control of the pressure $P_T$ indicative of inlet temperature supplied through line 67. As will be noted, the left end of cylinder 173 is vented to return pressure. As long as the engine inlet temperature is not excessive, the right end of this cylinder also is referenced to return pressure through a passage 194 and override valve 195. The override valve comprises a sleeve 197 and a spool 198 which constitute the usual two-way valve structure by which conduit 194 may be connected either to servo supply or return pressure. Spool 198 is biased by a compression spring 199 in the direction to admit supply pressure to cylinder 173. However, the valve is normally biased to hold the supply pressure port closed by $P_T$ communicated to it through line 67 and passage 162, which acts on the other end of the valve spool. Since $P_T$ is inversely proportional to the inlet temperature and therefore decreases as the temperature increases, spring 199 is calibrated so it overcomes the pressure in line 67 and admits servo fuel to passage 194 at the desired limiting value of inlet temperature. This fuel shifts piston 171 and thus follower 167 and pilot valve spool 187 and causes the piston 178 to move in the direction to decrease afterburner fuel. The result will be to decrease thrust and therefore aircraft speed, and thereby the inlet temperature, since the ram temperature rise will decrease with the decrease in aircraft speed. As the inlet temperature diminishes to a safe value, the cylinder 173 will be vented and the follower 167 may move to increase fuel, always subject to the temperature limit which may override the cam 166.

*Mach Number Fuel Control*

At high forward speeds of the aircraft, control of afterburner fuel to maintain a constant ratio of fuel to air is not satisfactory, principally because the thrust of the engine increases with speed and an unstable condition of operation results in which, as speed increases, engine thrust may increase more rapidly than aircraft drag. It is desirable to control the afterburner so as to maintain the aircraft at a selected speed. While such speed might be merely forward speed of the aircraft, it is preferable to control the speed to a definite Mach number, wherein Mach number is forward speed corrected for the absolute temperature of the ambient atmosphere.

In connection with this, we may consider first the means by which Mach number control is effected; then the transfer means to transfer the fuel control between fuel-air ratio control and aircraft Mach number control; and finally, the overrides or safety features provided by the turbine pressure ratio (T.P.R.) control as it affects both of these.

Mach number control is normally employed at aircraft speeds above Mach 1.2. The desired aircraft speed in this regime of control is set by a cam 210 moved by the pilot's power control 30 along with the fuel-air ratio cam 166; thus, at all times during afterburning a fuel-air ratio is set by cam 166 and an aircraft speed by cam 210. The selection of the cam to control is based upon the actual aircraft Mach number, as will be explained.

Figure 6:
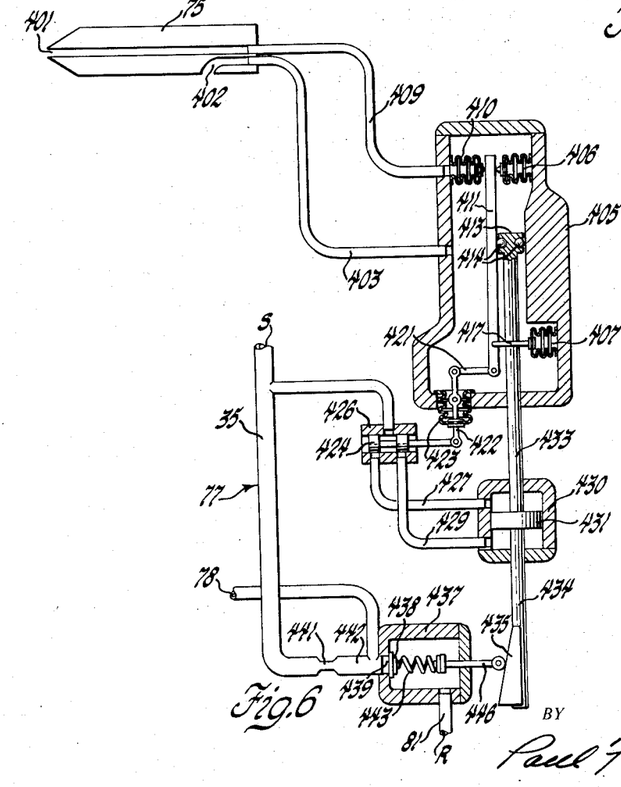
FIGURE 6 is a schematic drawing of a Mach number transducer of sensor.

The Mach number of the aircraft is measured by the Mach number sensor or transducer 77 shown in FIGURES 1 and 6. For the present, it is sufficient to note that this device transmits a pressure $P_M$ proportional to aircraft Mach number through line 78 to the afterburner fuel control. Line 78 communicates directly with the chamber 211 of Mach number control valve 212 in which it biases a standard two-way valve spool 213 against a compression spring 214 variably loaded by the follower 215 of cam 210.

For the Mach number control valve 212 to control the operation of fuel-air ratio piston 178, the transfer valve 185 moves downwardly to connect the servo fuel conduit 217 from valve 212 to chamber 179 in place of the conduit 186 leading from the fuel-air ratio control pilot valve 174. Assuming that cam 210 is moved to set follower 215 to provide a pressure load on spring 214, the metered fuel flow will be held at that value which causes the aircraft to move at such a speed that the Mach number pressure in chamber 211 just balances the load of spring 214. Overspeed or underspeed of the aircraft operates valve 212 to call for corresponding modulation of afterburner fuel.

The aircraft Mach number represented by the pressure in line 78, normally controls the transfer of operation of the control from fuel-air ratio control to Mach number control. The Mach number pressure line 78 is connected through a passage 221 and the override valve 222 to a chamber 223 within the body or sleeve 225 of the transfer valve 185. Pressure in chamber 223 biases valve spool 226 downwardly, such downward movement being opposed by the compression spring 227, the setting of which is variably adjusted by a calibrating screw 229. Normally, the valve spool 226 is in engagement with an annular seat 230 as shown. When the Mach number pressure exerted over the area of seat 230 becomes greater than the resisting force of spring 229, the valve spool moves downwardly. Upon such movement, the somewhat larger total area of the end of the valve spool is exposed to the Mach number pressure so that pressure is capable of moving the valve through its full stroke and of maintaining it in the position calling for Mach number control until a substantial decrease in speed below the critical point for initiation of Mach number control occurs. In the position for fuel-air ratio control shown, the valve connects passage 186 to the passage 231 leading to the fuel control servo 175 by way of the turbine pressure ratio control. When the Mach number pressure reaches a critical point, preferably corresponding to a speed of Mach 1.2, the valve moves downwardly, shutting off passage 186 and connecting passage 217 to passage 231. Upon subsequent decrease of aircraft speed to a valve somewhat below Mach 1.2, the reverse action occurs, and fuel-air ratio control is reinstated.

In Mach number control as well as fuel-air ratio control, it is important to limit fuel to prevent undue overtemperature in the compressor inlet which may cause damage to the compressor or possible flame-out. During fuel-air ratio control, this is accomplished by the piston and cylinder 171, 173 previously described. In Mach number control, it is effected by the override valve 222 which is supplied with servo fuel by the override valve 195 in response to excessive inlet temperature. The servo fuel is supplied through line 194, cylinder 173, and line 233 to the chamber 234 below the spool 235 of valve 222. Valve spool 235 is normally held by a compression spring against a stop in a position which connects the Mach number pressure conduit 221 to the chamber 223 of transfer valve 185. However, as pressure in line 233 increases through the action of valve 195 in response to high inlet temperature, valve spool 235 is moved against an upper stop, cutting off connection between line 221 and the transfer valve 185 and connecting the transfer valve chamber 223 through passage 237 to the servo return line. Valve 185 moves up to return servo 175 to the fuel-air ratio type of control. Since the fuel-air ratio control is provided with the inlet temperature override through the action of piston 171, the temperature limiting action will continue, but will be effected through action of piston 171. Override valve 222 acts by taking control away from the Mach number control which per se lacks provision for inlet temperature limiting.

*Fuel Shutoff and Pump Head Regulation*

As previously indicated, the fuel control system includes means for shutting off afterburner fuel or regulating the head across the metering valve, and for controlling the supply of energizing air to the fuel pump driving turbine 41. Regulation of the metering head as a function of engine inlet temperature under control of the pilot valve 140 has been described in detail. The afterburner control as shown in FIGURE 2 also includes means for putting high pressure fuel behind the head regulating valve member 141 so that it positively closes off flow of fuel to line 50 leading through the manifold selector to the afterburner. This is accomplished by the shutdown valve 146, which is controlled by a third cam 250 operated by the pilot's control lever 30, and which may be on a common shaft with cams 166 and 210. As illustrated, cam 250 cooperates with a sliding follower or tappet 251 biased by a spring 252 and slidable in a recess in a portion of the body or case 85. Tappet 251 is connected by a toggle link 254 to the movable spool 255 of valve 146. This spool is shown in a normal or afterburner operating position in which the valve connects line 147 leading from the metering head pilot valve to line 145 leading to the chamber 143 behind the valve member 141 of the head control valve 88. When the pilot's control is moved to shut down the afterburner, spool 255 is moved to the left as shown to connect servo fuel supply line 257 to the line 145. Full servo fuel pressure is thus put behind the member 141 to force it against the seat and shut off the afterburner. The pressure of the servo fuel, with the force of spring 142, is greater than the afterburner fuel pump discharge pressure.

Operation of the pilot's power control lever 30 to deactivate the afterburner also, through action of the coordinator 31, closes valve 43 by which air is supplied to the turbine 41 which drives the afterburner pump. Valve 43 may be any sort of mechanically or electrically operated valve which responds to the position of the lever 30. Regulation of the air supply to turbine 41 when the afterburner is in operation to insure that the head of the fuel pumped is sufficient to provide the required metering drop in the metering valve, and to guard against waste of power and undue wear resulting from too high a pressure, is accomplished by the servo valve 45 of FIGURE 1 shown schematically in some detail in FIGURE 5. The servo air control valve 45 acts to maintain a substantially constant relatively low pressure drop across the head regulating valve 88. To this end, control lines 46 and 47 which lead to the servo valve communicate with pressure taps 261 and 262 in the passage 87 ahead of the regulating valve and in the passage 50 downstream of it, respectively. These lines conduct pressures to chambers 263 and 264 on opposite sides of the diaphragm 265 which actuates a reciprocating stem 266 mounted in a cylinder 267. Bellows 268 seal the assembly to prevent leakage of fuel along the shaft 266. Stem 266 is biased by the pressure difference or drop across the regulating valve and by a compression spring 270 adjustably loaded by a screw 271 by which the regulating pressure drop is adjusted. Stem 266 controls the operation of an arm 273 having a fulcrum at 274 and reversely throttling the outlets of ducts 275 and 276 which exhaust fluid from the upper and lower ends, respectively, of a cylinder 278 in which a piston 279 reciprocates. Piston 279 is a part of a valve controlling power cylinder or servomotor 280 which operates a gate valve 281 controlling flow from air inlet line 285 to an outlet line 286 leading to the turbine 41.

Figure 5:
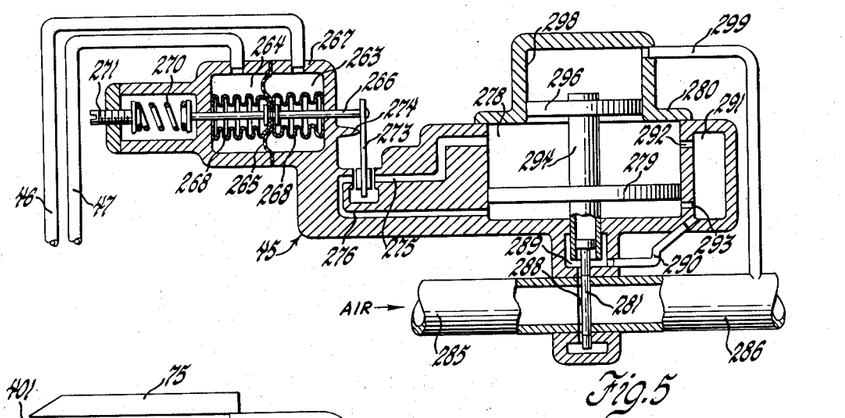
FIGURE 5 is an illustration, with parts in section, of a servo valve for controlling the supply of compressed air to the turbine which drives the afterburner fuel pump.

The chambers above and below piston 279 are bled through the throttling ports 275 and 276 previously mentioned. Air flows through the annular gap 288 ahead of valve gate 281, through a chamber 289 and conduit 290, into a chamber 291 from which it flows through throttling ports 292 and 293 into the chambers above and below piston 279. Piston 279 is fixed to valve gate 281 and also through a stem 294 to a smaller piston 296 reciprocable in cylinder 298. The space above piston 296 is supplied with air from conduit 286 through a line 299. This produces a force on piston 296 tending to close the gate valve which increases in proportion to the pressure of the air supplied to the fuel pump driving turbine 41. This provides a sloping characteristic for the gate valve control and stabilizes the operation of the turbine driven pump. Movement of piston 279 responds to the difference of pressure on the two sides of the piston which results from differential throttling by member 273 which, as previously pointed out, is determined by the pressure drop across the throttling valve 38.

The end result, therefore, is that just sufficient air is bled from the engine and supplied to the fuel pump driving turbine to produce sufficient head for metering plus a small additional head absorbed by the valve 88 to control the metering head across valve 86. There is, therefore, no waste of air bled from the engine and no excessive throttling at valve 88 to compensate for unnecessarily high supply pressure of afterburner fuel.

*Inlet Temperature Sensor*

Figure 3:
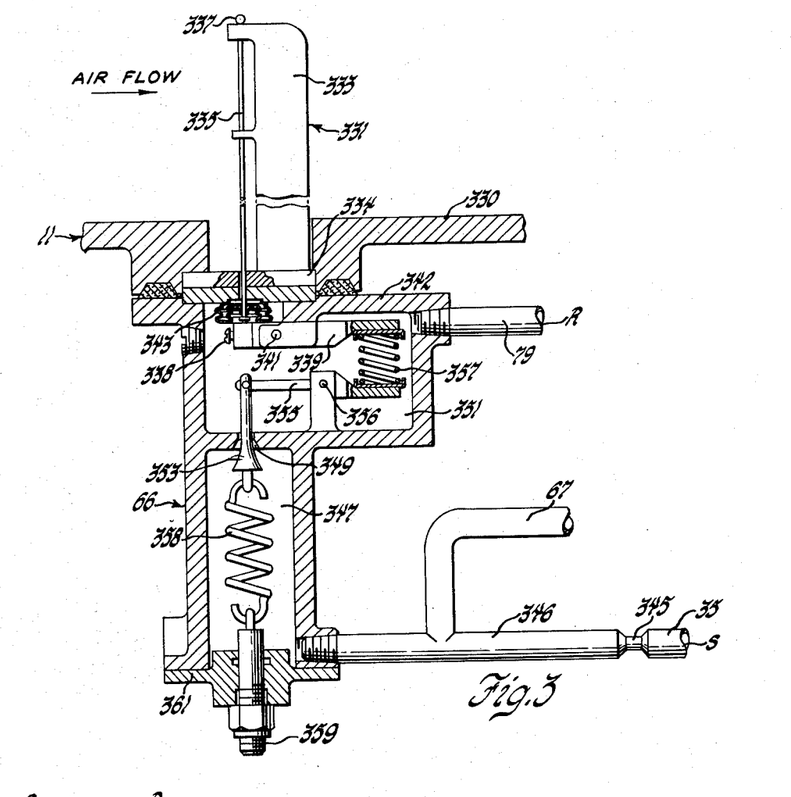
FIGURE 3 is a schematic sectional view of an engine inlet air temperature transducer or sensor.

The inlet temperature sensor or transducer 66 may be of any suitable structure so far as the system is concerned, but preferably such as is illustrated in FIGURE 3. In FIGURE 3, the inlet temperature sensor 66 is illustrated as mounted on the wall 330 of the air inlet section 11 of the engine. It comprises a probe structure 331 extending into the air flow passage of the engine. The probe comprises a rigid strut 333 of a metal of low thermal expansion such as Kennametal K6 rigidly supported on a base 334 piloted in an opening in the case 330. The probe also includes a tension wire 335, the outer end of which is fixed at 337 to the strut and the inner end of which is adjustably connected by a set screw 338 to one end of a rocker arm 339. The rocker arm 339 is supported on a fulcrum 341 in a housing 342 mounted on the air inlet case. A bellows 343 is provided to prevent leakage where the wire 335 extends through the case. The temperature sensor works through differential expansion of the wire 335 and strut 333. The wire should be of a metal of relatively high thermal expansion such as stainless steel, type No. 347.

This relative expansion of the strut 333 and tension wire 335 controls the port area of a valve 349 which in turn determines the pressure $P_T$ in the temperature sense line 67 which is connected, a previously stated, to the turbine pressure ratio control and the afterburner fuel control. The servo fuel line 35 is connected to the sensor 66 through a restriction 345 and a conduit 346 which is connected to the output line 67 and to a chamber 347 in the valve body. Chamber 347 communicates through a valved orifice 349 with a chamber 351 which is open to the drain or servo fuel return line 79. The effective area of orifice 349 is controlled by a tapered or contoured axially movable valve member 353, one end of which is pivoted to a rocker arm 355 fulcrumed at 356. Rocker arm 355 is coupled to rocker arm 339 by a compression spring 357; thus, valve member 353 is biased upwardly or in a direction to further restrict the orifice 349 by spring 357. Member 353 is biased downwardly or in the valve opening direction by a tension spring 358, the other end of which is coupled to a manually adjustable abutment screw 359 mounted in a head 361 of the valve body 342. As the temperature of the air within the engine case 330 increases, wire 335 expands relatively to strut 333, and rocker arm 339 moves counterclockwise on the urging of spring 357. This reduces the force of spring 357 and allows spring 358 to rotate rocker arm 355 counterclockwise and open the valve. This increase in the effective area of orifice 349 reduces the pressure in line 67 which is a function of the relative size of the restrictions 345 and 349. By suitably contouring the movable valve member 353, the pressure on line 67 may be caused to be very nearly inversely proportional to the absolute temperature of the air flowing into the engine through the casing 330.

*Mach Number Sensor*

The Mach number sensor or transducer 77 indicated in FIGURE 1 is shown schematically in some detail in FIGURE 6. Various Mach number computers are known, but it seems desirable to illustrate one suited to the requirements of the system of this invention. As illustrated in FIGURE 6, the sensor comprises a probe 75 having a total pressure opening 401 and a static pressure opening 402. The static pressure is communicated by a line 403 to the interior of a housing 405 within which are mounted two evacuated bellows 406 and 407. The total pressure opening is connected by a line 409 to a bellows 410 mounted in the housing 405 in opposition to bellows 406, which is of equal area to bellows 410. These bellows act in opposition on one end of a floating lever or force balance arm 411, which rocks about a movable fulcrum 413. The fulcrum 413 comprises a cage within which are mounted balls 414, one of which provides the support for arm 411 and the other of which rolls on the wall of the housing 405. The position of fulcrum 413 is determined by the ratio of total to static pressure, which in turn is a measure of Mach number. Bellows 407 is connected to the lever 411 by a link 417.

Since the effect of static pressure within the case on the bellows 406 and 410 is balanced, the effective force at the upper end of lever 411 as illustrated is proportional to total or ram pressure. This force tends to rock arm 411 clockwise. Static pressure acting on bellows 407 tends to rock the lever counterclockwise about the fulcrum. A servo 426, 431 responsive to any rocking movement of the lever 411 adjusts the fulcrum to maintain the arm in a balanced condition. The position of the fulcrum is therefore an indication of Mach number, which indication is converted by suitable valve means into the Mach number pressure $P_M$ transmitted through line 78. The lower end of arm 411 is coupled by link 421 and a rocker arm 422 sealed by a bellows 423 to the spool 424 of a standard servo pilot valve 426. Servo fuel is supplied through line 35 to valve body 426 and spool 424 directs it alternatively through conduits 427 and 429 to either end of a servo cylinder 430 within which piston 431 is reciprocable. Fluid may drain from the cylinder through the open ends of valve body 426 and be returned through drain line 81, the drain connection being not illustrated. Piston 431 is connected through piston rod 433 with the fulcrum 413 and through piston rod 434 extending through the other end of the cylinder with a cam 435 which controls a pressure regulating valve 437. Valve 437 comprises a poppet 438 acting against the seat 439. Servo fuel is supplied to the seat 439 from line 35 through a restriction 441. The Mach number pressure line 78 branches from line 442 between the restriction 441 and the valve 437. Valve poppet 438 is loaded in the direction to resist passage of fuel by a compression spring 443 variably loaded by a reciprocable cam follower 446 coacting with cam 435. The interior of the valve body 437 is drained through the line 81. The pressure in line 78 is a direct function of loading of spring 443. The loading of this spring, by suitably contouring cam 435, is made such a function of the position of fulcrum 413 that the pressure is directly proportional to the ratio of ram to static pressure and therefore to Mach number.

*Turbine Pressure Ratio Control*

The turbine pressure ratio control 70 provides control outputs in response to the pressure ratio across the two turbines, modified by inlet air temperature. The principal purpose of this device is to control jet nozzle area, which is one of the principal factors determining pressure ratio. Since the control of nozzle area has no direct relation to the fuel control which is the subject of this invention, it will not be described, but the presence of such control is indicated by the broken line 465 in FIGURE 1. The T.P.R. control may also serve other purposes, such as controlling the afterburner ignition (not shown).

The pressure ratio control device 70 (FIGURE 4) comprises a housing 470 to which servo fuel is supplied through line 35 and from which servo fuel is returned through line 79. Turbine inlet pressure $P_3$ is supplied through line 71 and turbine discharge pressure $P_6$ is supplied through line 72. The pressure $P_T$ indicative of inlet air temperature is communicated through line 67'. The T.P.R. control comprises a force balance type of ratio deriving mechanism generally similar to that of the Mach number sensor. A floating lever or balance arm 471 is coupled by tension rods to bellows 473 and 474 which are contracted by externally applied $P_3$ and $P_6$ pressures, respectively. The tension rods are sealed by bellows 476 which are balanced by bellows 477 within the pressure responsive bellows 473 and 474, respectively. Bellows 476 and 477 drain to servo return pressure. The movable fulcrum 480 for lever 471 is shifted by piston rod 481 fixed to a piston 483 reciprocable in a servo cylinder 484. The piston 483 has a rod 486 extending from the opposite face, of larger diameter than the rod 481. Servo fuel pressure acts against the smaller area face of piston 483 and is supplied through an orifice 487 to the larger area face. Pressure is bled from the larger area face through an orifice 488, the area of which is controlled by oscillation of the lever 471. The piston 483 will, therefore, automatically move fulcrum 480 to the position which causes the forces exerted by $P_3$ and $P_6$ on bellows 473 and 474 to be balanced about the fulcrum 480. The position of the piston varies directly as a function of $P_3$ divided by $P_6$. The piston rod 486 is connected through a floating lever 491 and link 492 to a lever 493 coupled to a valve stem 494. Movement of the piston 483, therefore, shifts valve stem 494. This valve stem is also moved by the inlet temperature responsive pressure which acts on a bellows 496 in opposition to a spring 497, thereby moving the lower end of floating lever 491 to modulate the position of valve stem 494, as a function of engine inlet temperature. The lower end of lever 493 has a movable fulcrum 498 which may be adjusted by a setting screw 499 to adjust the position of valve stem 494.

Figure 4:
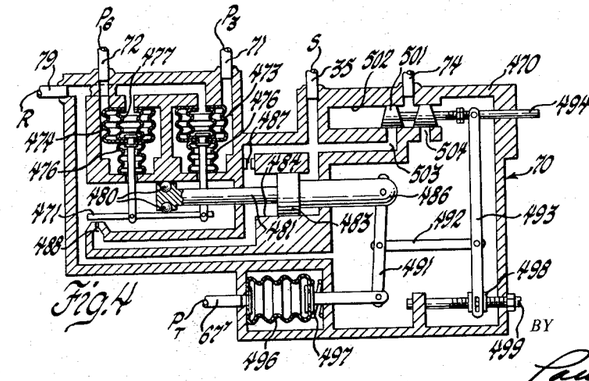
FIGURE 4 is a schematic diagram of a turbine pressure ratio sensor, modulated by inlet temperature, employed in the system.

Stem 494 is fixed to a movable valve member 501 slidable in a valve cylinder 502. In its normal position, valve member 501 shuts off control line 74 from both a passage 503 supplied with servo fuel and a port 504 which is at servo return pressure. However, if the turbine pressure ratio corrected for inlet temperature increases above 110% of the nominal value, the valve member opens port 504 to drain servo fuel from line 74. If the turbine pressure ratio decreases below 90% of the nominal value, valve member 501 opens port 503 to supply servo fuel to line 74.

So long as the turbine pressure ratio is within 10% of the nominal value, the T.P.R. control has no effect on afterburner fuel, but if the turbine pressure ratio is below 90%, the supplying of servo fuel through line 74 moves fuel-air ratio piston 178 to the left to decrease afterburner fuel, which will have the effect of raising the turbine pressure ratio. Likewise, if turbine pressure ratio becomes too large and is 10% over the nominal value, bleeding servo fuel from cylinder 179 permits the fuel-air piston to move to the right and increase afterburner fuel. The needle valve 183 shown in FIGURE 2b adjusts the response of the fuel-air piston, since it controls the supply to this piston from servo valve 174 which is connected to the cylinder in parallel with valve 501.

It is known that a turbine pressure ratio response may be used to control afterburner fuel or nozzle area so as to reduce fuel or open the nozzle to prevent unduly high back pressure in the turbine exhaust. Such back pressure might cause overfueling and overheating of the turbine or loss of power to drive the compressor, tending to stall the engine.

The turbine pressure ratio control is principally of value to limit fuel flow to the afterburner during fire-up before the nozzle is opened sufficiently to allow full afterburner flow. It may also be desirable to prevent too fast an increase of fuel during afterburning in response to a pronounced advance of the throttle.

*Manifold Selection and Shut-Off*

As previously pointed out, the afterburner fuel is fed progresssively and cumulatively to three manifolds 57, 58, and 59. The conduits 53, 54, and 55 leading to these manifolds are under control of valves in the manifold selector assembly 51. These may be suitable pressure-operated valves, the details of which are immaterial to the present invention. Servo fuel under pressure is supplied through line 61 by valve 146 (FIGURE 2b) from the servo fuel supply line 257' when the afterburner is shut down and valve spool 55 is moved to the left by power lever operated cam 250. This holds a valve closed which prevents flow of fuel into or of combustion gases from the conduit 53. When the afterburner is put into operation, valve spool 255 moves to the right, connecting line 61 to return, whereupon the pressure operated valve in selector 51 opens to allow fuel flow to manifold 57.

The supply of fuel to the additional manifolds 58 and 59 which are employed for higher fuel flow is controlled in response to the fuel-air ratio by a manifold selector pilot valve 540 mounted in the afterburner control body. Valve 540 comprises a sleeve 541 and a spool 542 fixed to the stem 177 of the fuel-air ratio piston 178. High pressure fuel is supplied to this valve through a branch 49' of the afterburner fuel supply line 49. When the piston rod 177 and valve spool 542 are to the left as illustrated in FIGURE 2a, high pressure fuel is supplied from line 49' to both lines 62 and 63.

As the stem 177 moves to the right to open metering valve 186 and increase the fuel-air ratio, spool 542 shuts off fuel pressure from line 62 and subsequently from line 63. When the pressure is removed from line 62, a valve in the selector opens to supply fuel to line 64 putting two fuel manifolds in operation. When line 63 is cut off, an additional valve is opened to supply fuel to line 65, thereby supplying all three afterburner fuel manifolds.

Since the pressure operated valves may be conventional, and the manifold selector is merely an accessory to our invention, the details of the manifold selector will not be described.

*Conclusion*

The operation of the various elements of the control as a whole have been described throughout the foregoing specification in connection with the description of the structures of the fuel control and appurtenant devices.

The invention is not to be regarded as limited in any way by the detailed description herein of the preferred embodiment thereof for the purpose of explaining the invention. It will be apparent that many modifications may be made by the exercise of skill in the art within the scope of the principles of the invention.

We claim:

1. A fuel control for a jet engine comprising, in combination, manually operable control means, fuel-air ratio control means set by the manually operable control means, fuel limiting means responsive to engine inlet air temperature, fuel metering means, and means responsive to inlet air temperature operable to couple the fuel-air ratio control means to the fuel metering means below a predetermined air temperature and to couple the fuel limiting means instead of the fuel-air ratio control means to the fuel metering means above said predetermined air temperature.

2. A fuel control for a jet engine comprising, in combination, manually operable control means, fuel-air ratio control means set by the manually operable control means, air speed control means set by the manually operable control means, fuel metering means, means responsive to air speed operable to couple the fuel-air ratio control means to the fuel metering means below a predetermined air speed and the air speed control means to the fuel metering means above said predetermined air speed, fuel limiting means responsive to engine inlet air temperature connected to and controlling the fuel-air ratio control means, and means responsive to engine inlet air temperature operable to shift control from the air speed control means to the fuel-air ratio control means.

3. An afterburner fuel control system for a turbojet engine having a compressor, combustion apparatus, a turbine, and an afterburner, the control system comprising, in combination, an afterburner fuel pump, a metering valve connected in series between the pump and the afterburner; means responsive to a condition indicative of pressure in the engine compressor connected to move the metering valve in one dimension so as to vary fuel flow proportionately to said pressure; afterburner fuel-air ratio control means connected to move the metering valve in another dimension to vary the fuel-air ratio; the ratio control means including manually operable means for setting a fuel-air ratio, Mach number control means responsive to air speed for controlling the fuel-air ratio, transfer means responsive to air speed for selectively connecting the manually operable means in control of fuel-air ratio below a predetermined air speed and the Mach number control means in control of fuel-air ratio above the said air speed, manually operable means for setting a Mach number control point; means responsive to a condition indicative of engine inlet air temperature connected to the transfer means so as to connect the fuel-air ratio control means in control upon the occurrence of excessive temperature; and override means responsive to a condition indicative of engine inlet air temperature connected to the fuel-air ratio control means so as to reduce fuel-air ratio to limit inlet temperature.

4. An afterburner fuel control system for a turbojet engine having a compressor, combustion apparatus, a turbine, and an afterburner, the control system comprising, in combination, an afterburner fuel pump, power means driving the pump; a metering valve and a head regulating valve connected in series between the pump and the afterburner, the said valves being throttling valves; means responsive to the pressure drop across the metering valve and to a condition indicative of engine inlet air temperature controlling the head regulating valve to maintain the said pressure drop a predetermined inverse function of the said temperature; means responsive to a condition indicative of pressure in the engine compressor connected to move the metering valve in one dimension so as to vary fuel flow proportionately to said pressure; afterburner fuel-air ratio control means connected to move the metering valve in another dimension to vary the fuel-air ratio; the ratio control means including manually operable means for setting a fuel-air ratio, Mach number control means responsive to air speed for controlling the fuel-air ratio, transfer means responsive to air speed for selectively connecting the manually operable means in control of fuel-air ratio below a predetermined air speed and the Mach number control means in control of fuel-air ratio above the said air speed, manually operable means for setting a Mach number control point; means responsive to a condition indicative of engine inlet air temperature connected to the transfer means so as to connect the fuel-air ratio control means in control upon the occurrence of excessive temperature; and override means responsive to a condition indicative of engine inlet air temperature connected to the fuel-air ratio control means so as to reduce fuel-air ratio to limit inlet temperature.

5. A fuel control system as recited in claim 4 including in addition means responsive to engine turbine pressure ratio connected to the metering valve so as to reduce fuel upon decrease in turbine pressure ratio below a desired level.

References Cited in the file of this patent
UNITED STATES PATENTS

| | | |
|---|---|---|
| 2,736,166 | Mock | Feb. 28, 1956 |
| 2,830,436 | Coar | Apr. 15, 1958 |
| 2,844,936 | Fowler | July 29, 1958 |
| 2,850,871 | Drake | Sept. 9, 1958 |
| 2,861,420 | Lewis | Nov. 25, 1958 |
| 2,941,602 | Coar | June 21, 1960 |